Nov. 16, 1954   F. M. ATKINSON   2,694,496
METHOD AND APPARATUS FOR HANDLING PULVERULENT MATERIALS
Filed Sept. 29, 1951   2 Sheets-Sheet 1

INVENTOR.
Fred M. Atkinson
BY
Williamson & Williamson
ATTORNEYS

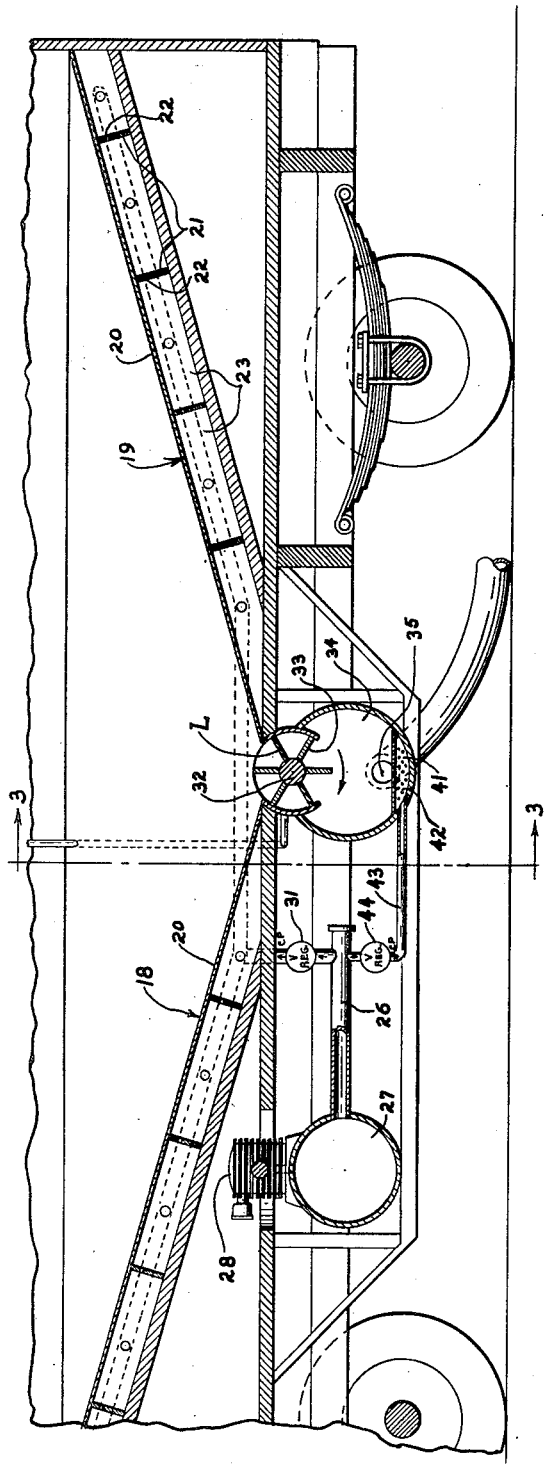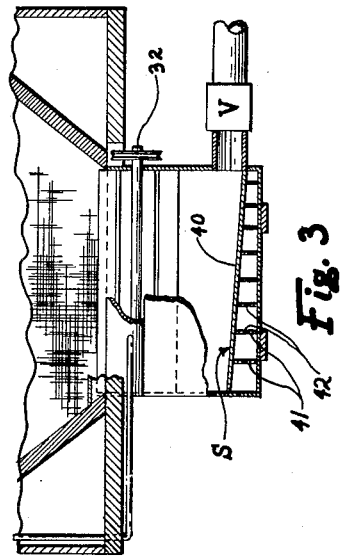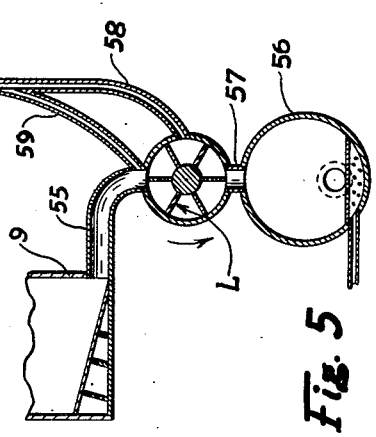

United States Patent Office 2,694,496
Patented Nov. 16, 1954

2,694,496

METHOD AND APPARATUS FOR HANDLING PULVERULENT MATERIALS

Fred M. Atkinson, Minneapolis, Minn., assignor to Atkinson Milling Company, Minneapolis, Minn.

Application September 29, 1951, Serial No. 248,955

5 Claims. (Cl. 214—17)

This invention relates to apparatus and methods for conveying pulverulent materials. More particularly, it relates to apparatus and methods for conveying such materials with a minimum of inconvenience and capital investment and a maximum of speed for relatively short distances such as, for instance, from a delivery vehicle into the interior of a storage bin.

Most industries dealing in pulverulent materials, and especially the flour milling industries, are in need of a simple, cheap and efficient method and apparatus for conveying such material from place to place, either in moving such material within the interior of the manufacturing plant itself or in delivering such material to the purchaser. In the flour milling industry, for example, it is well known that large bakery establishments require frequent and rapid deliveries of flour, such deliveries generally being made direct from the mill if the latter exists within the same locality. Such deliveries normally require a very substantial outlay of manpower and equipment. In making such deliveries it is oftentimes necessary to convey the flour an appreciable distance both horizontally and vertically from the delivery unit in order to empty the material into the temporary storage bin or container of the bakery. My invention is directed toward providing a new and improved method and apparatus for accomplishing this purpose.

Many methods and many different types of apparatus have been suggested previously for conveying pulverulent materials. Most of these have accomplished the transportation of such materials through the use of the principle of pneumatic conveying in contrast to my methods and apparatus which I prefer to term conveying by fluidization. By pneumatic conveying I am referring to the use of approximately 1-3 pounds of air for each pound of the material being conveyed, such air acting as a carrier agent and moving the material with it and incidental to its own movement. In pneumatic conveying, air pressures of less than one pound per square inch are used and the air travels in the neighborhood of 2000 to 5000 feet per minute. The air stream in such a conveying process has the material fed thereinto in relatively small quantities and it often has "dead spots" wherein no pulverulent material whatsoever is being carried therewith. Because of the large volume of air utilized in conveying such pulverulent materials by pneumatic conveying it is necessary that the air be filtered if a product such as flour is to be conveyed and collected or deposited. Consequently, the cost of such conveyance is thereby raised substantially. Moreover, the density of the material conveyed by such a method is necessarily very low, the conduit must be relatively large, the air speed relatively high, and the horse-power relatively great so that the over-all efficiency of such method is low.

My invention contemplates the use of the principle of what I prefer to call fluidized conveyance. In utilizing this principle the pulverulent material is thoroughly mixed with sufficient air to enable the material to assume characteristics of a fluid such as water so that it will, of its own accord, attempt to seek a lower level through the action of gravity thereupon. If the air is thoroughly and properly mixed with the pulverulent material such as flour, approximately 200 pounds of the material can be conveyed while mixed with only a single pound of air. Such thorough mixing alone, however, is insufficient to cause the fluidized material to rise to a higher elevation or to be moved a substantial distance horizontally without providing apparatus for maintaining the material in a fluidized state along its path of conveyance. Consequently, I have utilized air pressures substantially higher than those utilized in pneumatic conveying. I utilize air pressures within the range of 2 to 50 pounds of air pressure and preferably within the preferred range of 5 to 30 pounds of air pressure. This is in contrast to the air pressure normally used in pneumatic conveying wherein normally less than one pound of air pressure is used. Similarly, the air flow in fluidized conveyance is substantially slower than the rate of flow of air in pneumatic conveying. The air flow in the former is within approximately 300 to 500 feet per minute in contrast to the much higher speed of flow in pneumatic conveying, about 2000 to 5000 feet per minute.

Pulverulent materials which have been properly fluidized have characteristics very similar to that of water and I have found that when such material is subjected to pressure within a substantially closed container, while in such state, the pressure will cause the fluidized material to fill a conduit which is connected to the discharge of the container. The conduit will be completely filled with the fluidized material and a continuous flow will pass through the conduit, maintaining the conduit completely filled at all times. Thus, it is readily obvious that a substantially increased volume of such material per unit space can be conveyed in this manner.

It has been known previously that pulverulent materials could be fluidized through the use of an air slide, gravity thereafter causing the same to move toward a lower level. No means has ever been suggested previously, however, for moving such material while in a fluidized state to a higher level or even through extended horizontal distances without providing additional fluidizing mechanism along the path of conveyance. My invention is directed toward making such conveyance possible. It is also directed toward accomplishing this purpose with a minimum of apparatus and maximum efficiency, the apparatus required being simple and cheap to manufacture and operate.

Wherever hereafter the term fluidization is used, it is intended to include both mechanical and pneumatic means for placing such materials in a fluidized state. It is intended to include, in fact, any means whatsoever for mixing such material thoroughly with sufficient air to provide it with the properties of a fluid such as water. No claim is made herein as to means for accomplishing such a purpose except in combination with the additional structures hereinafter recited to accomplish the purposes outlined above.

It is a general object of my invention to provide a novel and improved method and apparatus for the conveyance of pulverulent material, the apparatus being both simple to manufacture and operate and capable of increased efficiency.

A more specific object is to provide a novel and improved method and apparatus for conveying pulverulent materials which will accomplish that purpose with a minimum of apparatus and capital investments.

A still more specific object is to provide novel and improved methods and apparatus for conveying pulverulent materials from a portable delivery unit into a container, the apparatus being such as to quickly and cheaply empty itself into another container spaced and/or elevated with respect thereto.

Another object is to provide a novel and improved portable delivery unit for conveying pulverulent materials which will quickly empty itself into another container spaced and/or elevated with respect thereto with a minimum of expense, time and apparatus.

Another object is to provide a self-contained portable delivery unit for conveying pulverulent materials which will empty itself without handling large volumes of air and which will at the same time require a minimum of apparatus and hence substantially reduce the manufacturing cost of the total unit.

Another object is to provide method and apparatus for conveying pulverulent materials quickly from one container to another container, the latter being spaced and/or elevated with respect to the first mentioned container, the conveyance being accomplished with a minimum of expense, time and apparatus.

Another object is to provide a novel and improved delivery unit for delivering bulk flour direct from the mill to the bakery which will eliminate the need for sacking, packing, etc., of the flour, reduce the amount of storage space needed, and eliminate the need for the expensive equipment normally required within large bakeries for emptying such units and transporting the flour into temporary storage bins or rooms.

These and other objects and advantages of my invention will more fully appear from the following description made in connection with the accompanying drawings, wherein like reference characters refer to similar parts throughout the several views and in which:

Fig. 2 is a vertical sectional view taken longitudinally of the structure shown in Fig. 1;

Fig. 3 is a fragmentary vertical sectional view taken transversely of the delivery unit and approximately along line 3—3 of Fig. 2.

Fig. 5 is a diagrammatic view of a modification of my invention wherein the air lock is spaced relative to the bin.

Figure 1:
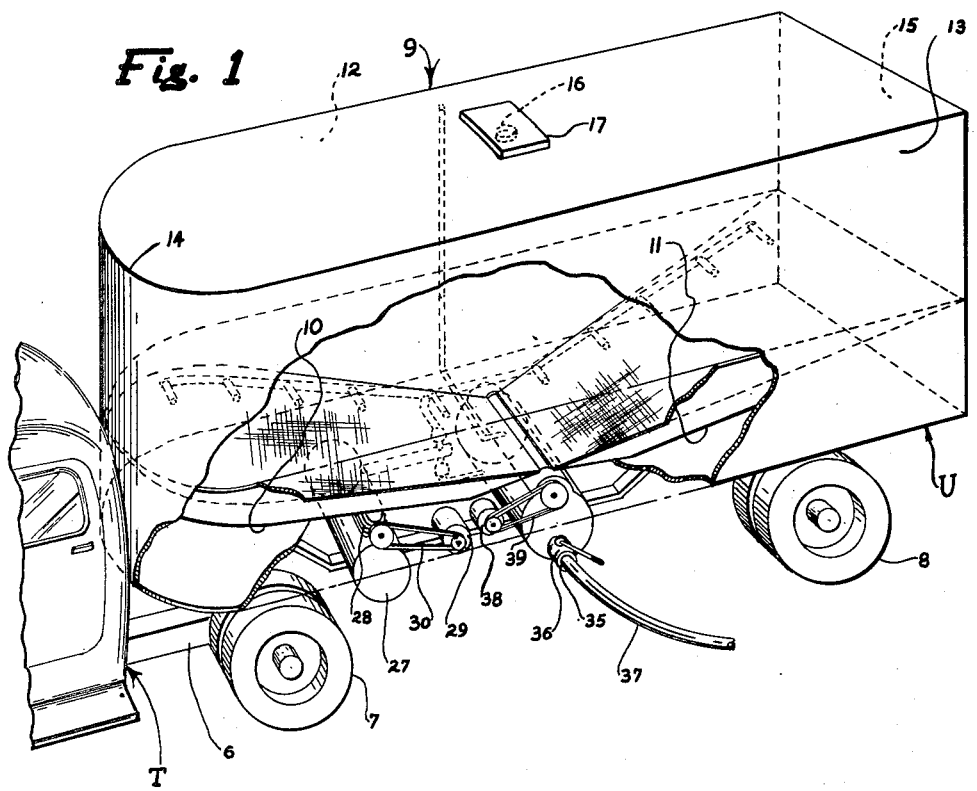
Fig. 1 is a perspective view of a delivery unit embodying one form of my invention and having portions thereof broken away to disclose the interior.

One embodiment of my invention, as shown in Figs. 1–4, may include a delivery unit indicated generally as U detachably connected to a truck T which is shown fragmentarily in Fig. 1. The frame 6 of the delivery unit U may be made ambulant by front wheels 7 and rear wheels 8. Mounted upon the frame 6 is a non-pressurized bin 9 having bottom walls 10 and 11 sloping toward the center of the bin from the front and the rear. The side walls of the bin have been indicated as 12 and 13, the front end wall as 14 and the rear end wall as 15. Within the top of the bin is an opening 16 provided with a cover member 17 through which the pulverulent material may be inserted.

Figure 4:
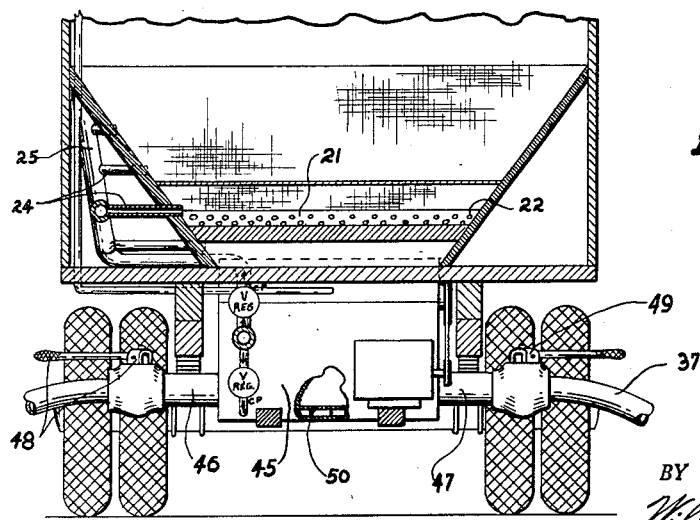
Fig. 4 is a fragmentary view of a second embodiment of my invention, the construction of which is identical except for the pressure chamber shown having dual discharge outlet positioned at its opposite ends and having a horizontally disposed air slide therewithin.

Superimposed upon the bottom walls 10 and 11 and extending substantially parallel thereto is a pair of air slides indicated generally as 18 and 19. Each of these air slides, as shown, is comprised of a fabricated sheet 20 which, as shown, is 4-ply canvas or belting. This fabric sheet 20 is maintained substantially parallel to the bottom walls 10 and 11 by upright cross supports 21 extending transversely to the length of the delivery unit and between the side walls 12 and 13. Each of these cross supports 21 is provided with a plurality of apertures 22 extending therethrough to connect the spaces 23 between the cross supports with each other. The fabricated sheet 20 is sealed against the side walls 12 and 13 so as to prevent the escape of air therebetween and to prevent the pulverulent material from passing therebetween. Between each of the pairs of cross supports 21 a relatively short leading conduit 24 enters the space 23, as best shown in Fig. 4. Each of these leading conduits 24 is connected to a common conduit 25 and this common conduit in turn is connected to a parent conduit 26. The parent conduit 26 leads into a compression drum 27 upon which is mounted a compressor 28. This compressor 28 is operated by a motor 29 and driven by an endless belt 30. A valve 31 is interposed between the parent conduit 26 and the common conduit 25, this valve being of the type to permit sufficient air to establish a pressure of ½–2 pounds within the spaces 23 to pass therethrough. It is obvious, of course, that separate sources of air pressure could be supplied instead of utilizing the parent conduit 26.

Mounted transversely of the length of the delivery unit U is an air lock pulverulent material feeder L. This air lock may include a shaft 32 rotatably mounted and extending across the width of the bottom of the bin 9. Extending radially throughout the length of the shaft 32 is a plurality of arms or partition members 33 forming compartments therebetween, these arms being constructed to carry some of the pulverulent material from the bin 9 around with it when the shaft 32 rotates and without substantially reducing the air pressure existing in an elongated material-receiving or pressure chamber 34. As shown, this air lock is mounted within the upper portions of the pressure chamber 34 and extends lengthwise thereof.

This pressure chamber 34, as shown, has a restricted outlet 35 which is equipped with a quick-closing valve 36 and which is adapted to be connected to a flexible conduit 37 of sufficient length to reach the interior of the container to which the pulverulent material is to be transferred. The air lock L is driven, when desired, by a second motor 38 which is equipped with an endless belt 39.

Mounted within the pressure chamber 34 and extending lengthwise thereof throughout its lower portion is a second air slide indicated generally as S. This air slide may be comprised of a fabricated sheet 40 made of material similar to the sheets 20 in the air slides referred to above. This fabricated sheet 40 is likewise supported by transversely-extending support arms 41, each of which have a plurality of apertures 42 extending therethrough to connect the spaces therebetween with each other. A conduit 43 leads from beneath the sheet 40 to the parent conduit 26. A valve 44 is interposed between the parent conduit and the conduit 43, this valve being of the type to permit sufficient air to pass therethrough to pressurize the interior of the chamber to the desired pressure, depending upon the distance and elevation through which the material is to be moved.

If desired, the bin 9, the air lock L and the pressurized chamber 34, along with its discharge outlet 36 and the conduit 37, may be looked upon as a conveyor-conduit system in which the pressure chamber 34 would constitute a material-receiving chamber and wherever hereinafter such terms are utilized they are intended to so connote.

Fig. 4 shows a pressure chamber 45 having a pair of outlets 46 and 47 at its opposite ends and a pair of quick-closing valves 48 and 49 associated therewith. The air slide 50 is constructed identically with the air slide shown in Figs. 1–3 except that it is disposed horizontally.

Fig. 5 shows diagrammatically a slight modification of my invention wherein I have the air lock L spaced from the bin 9 and connected thereto by a conduit 55 and wherein the air lock is also spaced relative to the pressure chamber 56 and connected thereto by a conduit 57. I have found that in such an arrangement it is advantageous to provide a bleeder conduit 58 which extends upwardly and enters the bin 9 adjacent its top. A second bleeder conduit 59 leads from the conduit 58 into the conduit 55 adjacent the point where the latter communicates with the air lock. I have shown in Fig. 2 a bleeder conduit similar to the conduit 58. These bleeder conduits serve to release the pressure quickly without disturbing the flow of material and provides a ready escape for any air which may be released as a result of some of the material leaving the fluidized state. In other words, the conduit obviates the necessity for any air so released to pass upwardly through the entire mass of material in the conduit 55. Thus, the released air is not working against the flow of the material and disrupting it to any degree whatsoever.

*Operation*

In operation, the motor 29 is started to create pressure within the compression chamber 27 whereupon air will be permitted to pass through the valve 31 and into the air slides 18 and 19. The air passing into the air slides 18 and 19 will pass upwardly into the fabricated sheets 20 and mix thoroughly with the pulverulent material which, for the sake of clarity, will be hereinafter referred to as flour. This upward movement of the air through the flour causes the flour to fluidize, or in other words, enables it to flow in a manner similar to water. It appears that the various particles of flour are maintained in a state of temporary suspension but regardless of the exact nature of the phenomena which takes place it is known that the flour will flow down the inclines of the air slides 18 and 19 and into the air lock L. As the pressure in the compressor rises, the air will pass through the valve 44 and through the air slide S to pressurize the interior of the pressure chamber 34 to a level above 5 pounds per square inch. It will be noted that the air slide S is slightly inclined toward the discharge outlet 35. When the pressure within the pressure chamber 34 has reached the desired pressure, which will depend upon the distance, curvature of path, and elevation through which the flour is to be conveyed, the motor 38 will be started to cause the air lock L to rotate. The arms 33 of the air lock L measures out substantially equal quantities of flour and withdraws the same from the interior of the bin 9 and deposits it into the pressure chamber 34 without substantially reducing the air pressure within the pressure chamber. This air lock may be operated to continuously feed the flour into the interior of the pressure chamber and is normally so operated until such time as the bin 9 becomes empty.

As the flour is deposited by the air lock L into the pressure chamber 34 this material is at least partially maintained in a fluidized state by the passage of air upwardly through the air slide S. If some of the flour does return to its normal solid state the same will be immediately fluidized again by the air slide S in the pressure chamber. It will be noted that the passage of air upwardly through the air slide S as shown continuously fluidizes the flour therewithin and simultaneously pressurizes the interior of the pressure chamber.

It appears that if the valve 36 is not opened, the flour within the pressure chamber 34 will remain in a fluidized state despite the fact that it has been filled by the air lock L. In such an instance, the air lock L will continue to carry the flour disposed between the arms 33 around with it without packing the interior of the pressure chamber.

When the valve 36 is opened the flour will rush through the conduit 37 in a full stream completely filling the interior of the conduit in a manner similar to that which would be expected of water. In this manner the entire bin 9 may be quickly emptied without requiring a large amount of expensive equipment and without a prohibitive capital investment on the part of bakeries.

If it should become necessary to cut off the flow through the conduit 37 for some unusual reason, this may be readily accomplished without hindering the operation of the unit by first shutting off the motor 38 and thereby causing the air lock L to cease to rotate. Within a very short time the pressure within the pressure chamber 34 will clean the remaining flour therefrom and also drive out the remaining flour from the conduit 37. As soon as this has been accomplished the valve 36 may be closed and the operation may be resumed when desired in the manner described above. Thus, it can be seen that there is no danger of plugging this system if it is operated properly.

The structure shown in Fig. 4 is dischargeable to either side and hence facilitates the use of the unit in areas where it would be inconvenient to withdraw from one side or the other of the unit. The fluidized flour will flow in either direction, depending upon which valve is opened and, as pointed out above, the air passing upwardly through the air slide 50 will fluidize the flour to an ample depth to insure that the complete opening of the outlets 46 and 47 are covered.

It is contemplated that in actual practice the pressure chamber which may be utilized will be relatively smaller with respect to the over-all size of the bin 9. It is also possible, of course, that the air lock may be reduced or expanded in size, depending upon the specific needs which will be determined largely by delivery rate requirements.

It is also contemplated that other means for fluidizing the flour may be utilized in either one or both of the non-pressurized bin 9 and the pressurized chamber 34. It is contemplated, for example, that agitators or other mechanical means might be used and as such will produce satisfactory results for several pulverulent materials when used in combination with the remaining structure as shown.

In actual use, the bin 9 will, in all probability, be loaded at the mill with somewhat similar equipment to that disclosed, the conduit discharging the flour into the bin 9 through the inlet 16. After the bin has been loaded the truck T will be utilized to draw the delivery unit U to a point adjacent the bakery to be serviced and then detached therefrom permitting the truck to be utilized for drawing other and similar delivery units to their unloading locations. A single operator may be left with the delivery unit U to quickly unload the bin 9 of its contents. It should be noted that in this manner the need for packaging or bagging the flour has been completely eliminated, thus saving the cost of the bags, the labor involved in packing and transporting such bags, and also saving in the amount of space required within the bakery for storage. It is obvious that when a quick and ready delivery may be made in the manner described, it is no longer necessary for a bakery to maintain relatively large storage space and hence a substantial saving is effected. In addition, and perhaps even more important, less capital investment is required on the part of the baker.

It should be noted that by utilizing a very small pressure chamber 34 it is not necessary to construct the walls of the bin 9 of relatively heavy material so that the interior thereof may be pressurized. By utilizing a small pressure chamber connected with an air lock to the large non-pressurized chamber, the over-all weight of the unit is substantially reduced and the entire unit is substantially cheaper to manufacture. In addition, the lighter weight of the unit makes it possible under usual highway weight limit restrictions to carry a greater pay load of pulverulent material.

One of the most important advantages of my invention is that it permits a substantial saving through the use of a minimum of apparatus. It is possible, when utilizing one of my delivery units, to rapidly convey an order of flour to a bakery and deliver the contents of the unit into the bakery upon very short notice and without any loss of time as compared to other apparatus. At the same time, the use of such a unit eliminates the need for the relatively expensive equipment which previously has been required within the larger bakeries for emptying the contents of boxcars, trucks or various other transport vehicles into the storage space of the bakery.

I have found that the preferred pressure for utilization within the small pressure chamber 34 is 5 to 30 pounds per square inch. This may be varied, of course, to extend up to 50 pounds per square inch or even higher and may be lowered to as low as 2 pounds per square inch when the distance and elevation is relatively small. In our tests I have found that a pressure of 7 to 8 pounds within the pressure chamber 34 will move flour through a conduit having an interior diameter approximating that of a human arm a horizontal distance of at least 80 to 150 feet and through an elevation of at least 20 feet. Such tests have shown that the conduit will be completely filled with the flour at all times during the conveyance. The pressure to be utilized may be increased slightly as the distance or elevation is increased. It appears that the horizontal distance through which the material is transferred, the friction which results from bends in the conduit, and the height to which the material must be elevated are of greatest importance in determining the pressure required. In our tests, the pressure in the air slides 18 and 20 has been found to be sufficient when maintained within the limits of ½ to 2 pounds.

In conclusion, it is readily apparent that I have provided novel and improved methods and apparatus for conveying pulverulent materials from one location to another at a substantial savings in time, labor, and materials. In addition, I have made it possible to effect such a conveyance with a minimum capital investment and with maximum efficiency.

It will, of course, be understood that various changes may be made in the form, details, arrangement and proportions of the parts without departing from the scope of my invention.

What I claim is:

1. Apparatus for conveying fluidized pulverulent materials, predominantly of solids, from one container to another, said apparatus including in combination a closed chamber having a material inlet adapted to be connected in material-receiving relation to a container for such pulverulent materials, and having a discharge outlet adapted to be connected to a discharge conduit, and having an air inlet connected to a source of compressed air which continuously supplies the compressed air to said chamber within the ranges of 2 to 50 p. s. i., and a movable air-lock-pulverulent-material-feeder positioned across the inlet to receive the pulverulent material therein and for introducing the same into, and substantially preventing escape of air from, the chamber, the supplied air in the chamber fluidizing the pulverulent material therein and pressurizing the chamber, the pressurized and fluidized material thereby being continuously discharged from the chamber through the outlet, the size of the outlet being small relative to the inlet so that the discharged pulverulent material is continuously and uninterruptedly conveyed through the conduit in a substantially solid stream at a velocity of flow below that of pneumatic conveying.

2. The apparatus as defined in claim 1, wherein the pressure of said compressed air constitutes the sole motivating force upon such materials to effect the discharge thereof through said outlet in a substantially solid discharge conduit-filling stream.

3. The apparatus defined in claim 1, wherein the pressure of said compressed air constitutes the sole motivating force upon such materials to effect the fluidization and discharge thereof through said outlet in a substantially solid discharge conduit-filling stream.

4. The apparatus defined in claim 1, wherein said air-lock-pulverulent-material-feeder includes a power-driven rotary air-lock connected to the material inlet-defining portions of said chamber and extends thereacross, means for driving said air-lock, said air-lock when driven introducing such pulverulent materials into said chamber and presenting the material to a point adjacent said air inlet for fluidization thereof and expulsion through said discharge outlet in a substantially solid discharge conduit-filling stream.

5. The apparatus defined in claim 1, wherein said air-lock-pulverulent-material-feeder includes a power-driven rotary air-lock connected to the material inlet-defining portions of said chamber and extends thereacross, means for driving the air-lock, said rotary air-lock having a plurality of peripherally arranged spaced apart radially extending material-carrying elements forming compartments which, when said air-lock is driven, introduce such pulverulent materials from said compartments into said chamber and preclude the escape of air therefrom and present the material to a point adjacent said air inlet for fluidization thereof and expulsion through said discharge outlet in a substantially solid discharge conduit-filling stream.

References Cited in the file of this patent

UNITED STATES PATENTS

| Number | Name | Date |
|---|---|---|
| 1,553,539 | Kinyon | Sept. 15, 1925 |

FOREIGN PATENTS

| Number | Country | Date |
|---|---|---|
| 266,901 | Great Britain | Mar. 10, 1927 |
| 325,544 | Great Britain | Feb. 21, 1930 |
| 654,229 | Germany | Dec. 15, 1937 |